US006829835B2

(12) United States Patent
Pfeil

(10) Patent No.: US 6,829,835 B2
(45) Date of Patent: Dec. 14, 2004

(54) LIFTING VEHICLE

(75) Inventor: Daniel Pfeil, Giesen (DE)

(73) Assignee: Martin Pfeil TRAWID-GmbH, Giesen (DE)

( * ) Notice: Subject to any disclaimer, the term of this patent is extended or adjusted under 35 U.S.C. 154(b) by 0 days.

(21) Appl. No.: 10/300,879

(22) Filed: Nov. 21, 2002

(65) Prior Publication Data

US 2004/0098872 A1 May 27, 2004

(51) Int. Cl.[7] .................................................. G01C 9/00

(52) U.S. Cl. ....................... 33/333; 33/366.11; 414/699

(58) Field of Search ...................... 33/333, 365, 366.11, 33/366.12, 366.13; 414/69 B, 699, 636; 187/224

(56) References Cited

U.S. PATENT DOCUMENTS

| | | | | | |
|---|---|---|---|---|---|
| 2,603,368 | A | * | 7/1952 | Vance | 414/620 |
| 3,883,021 | A | * | 5/1975 | Wilhelm | 414/634 |
| 4,288,056 | A | * | 9/1981 | Bergstrom | 248/542 |
| 5,131,801 | A | * | 7/1992 | Melanson | 414/635 |
| 5,383,524 | A | * | 1/1995 | Rinnemaa | 173/1 |
| 5,391,043 | A | * | 2/1995 | Bohata et al. | 414/544 |
| 5,697,755 | A | * | 12/1997 | McCauley et al. | 414/634 |
| 6,240,353 | B1 | * | 5/2001 | Ishikawa et al. | 701/50 |
| 6,396,163 | B1 | * | 5/2002 | Sugiura et al. | 307/9.1 |
| 6,516,527 | B1 | * | 2/2003 | Moriyasu | 33/366.15 |
| 6,526,668 | B1 | * | 3/2003 | Beckhart et al. | 33/366.11 |
| 2003/0206793 | A1 | * | 11/2003 | Retzlaff | 414/636 |

FOREIGN PATENT DOCUMENTS

| | | | |
|---|---|---|---|
| WO | WO 79/00330 | | of 1979 |
| WO | WO-93/17952 | * | 5/1993 |

* cited by examiner

*Primary Examiner*—Diego Gutierrez
*Assistant Examiner*—Tania Courson
(74) *Attorney, Agent, or Firm*—Whitham, Curtis & Christofferson, PC

(57) ABSTRACT

In a lifting vehicle having a holding and lifting device(5, 6) for holding and raising or lowering goods (9) and having a central operating device for controlling the travelling and handling of the goods (9) held by the holding device (6), the handling of sensitive goods by the person operating the lifting vehicle can be made easier or monitored by the holding device (6) being equipped with a sensor device (8) for the instantaneous inclination and/or the instantaneous accelerations of the holding device (6).

15 Claims, 6 Drawing Sheets

LIFTING VEHICLE

BACKGROUND OF THE INVENTION

1. Field of the Invention

The invention relates to a lifting vehicle having a holding and lifting device for holding and lifting or lowering goods.

Lifting vehicles of this type are in use in many embodiments. Lifting vehicles of this type designed in the manner of a forklift truck have a driver's position with a central operating device, from which the vehicle is driven and the handling of the transported goods is controlled. In this case, in front of the driver's position there is a vertical guide in the form of a mast or the like, on which a holding device is guided such that it can be moved vertically. The holding device can be constructed as a gripping device in order to transport particular goods.

2. Background Description

Using such a lifting vehicle, goods which are firstly heavy and secondly sensitive are often transported, such as paper reels in a print shop. The paper reels set down on an end are in this case gripped by a tongs-like gripper, are lifted and, for the purpose of transport, are rotated into a horizontal position of the cylinder axis of the paper reel. At the destination, the gripping device is rotated through 90° again in order to set the paper reel down again at one end. This setting down requires particular care, since in the event of not precisely vertical lowering of the end of the paper reel, the sections of the windings of the paper reel which contact the floor first are pressed in because of the high pressure, so that the unwound paper web is no longer smooth at the edge in the desired manner and is therefore unusable for many applications. In serious cases, a complete paper reel which, to an order of magnitude, weighs some tons, can become unusable. This applies similarly when the action of setting the paper reel down on the floor is not carried out at the necessary slow speed and the end of the paper reel is compressed highly on the floor. In this case, too, the paper at the edge of the paper reel becomes unusable.

The same is of course true for other sensitive goods which are transported by a lifting vehicle. The operator of a lifting vehicle therefore bears a considerable responsibility for the proper handling of goods which, under certain circumstances, may be valuable. In some cases, it is therefore expedient to be able to establish when damage to valuable goods has occurred during transport.

WO 79/00330 has disclosed a lifting vehicle with the features mentioned at the beginning, the sensor arrangement being formed, for example, by a potentiometer, with which the relative inclination of the lifting forks in relation to a reference plane, for example the supporting plane for the wheels of the lifting vehicle, can be indicated. In order to pick up the goods, in this case the holding forks can be brought into a horizontal position. An upward inclination prevents the goods picked up slipping off the forks, while a downward inclination is used for unloading. In the case of a gripping device for gripping paper reels, a precise vertical position ensures that the clamping arms run parallel to the axis of the paper reel.

SUMMARY OF THE INVENTION

The present invention is based on the problem of constructing the lifting vehicle in such a way that the operator can be supported or monitored better and more comprehensively by monitors during the proper handling of the goods transported by the lifting vehicle.

Starting from this problem, according to the invention a lifting vehicle of the type mentioned at the beginning is defined by the fact that the sensor device has at least one acceleration measuring device for determining the instantaneous inclination and/or the instantaneous acceleration of the holding device.

The lifting vehicle according to the invention therefore has an acceleration measuring device with which the instantaneous inclination and/or the instantaneous acceleration of the holding device can be determined. The acceleration measuring device can also detect static accelerations, so that the acceleration due to gravity—and therefore the inclination relative to the vertical—is measured.

If the holding device can be rotated about only one axis of rotation, which for example is at right angles to the guide of the lifting device, only one inclination measurement in a plane parallel to the guide is also practical, since any inclinations as a deviation from a desired position can be compensated for only in this plane as a result of the rotation of the holding device. However, if there is also a further possible adjustment, for example by means of pivoting the guide of the lifting device, it is practical for the sensor device to be designed to detect the instantaneous inclination in three-dimensional space. To this end, the sensor device can have two acceleration measuring devices substantially orthogonal to each other.

It is possible to imagine equipping the sensor device in such a way that it outputs an optical signal, for example, when an inclination of the goods which is not beneficial to setting them down is detected. However, preference is given to a connection between the sensor device and the operating device, so that for example the operating device can be equipped with an indicator for the instantaneous inclination of the holding device. Additionally or alternatively, it is possible to provide a processing stage in the operating device, which uses the output signals from the sensor device to influence the control of the holding and lifting device, specifically in such a way that, for example, only inclination-free setting down of the goods on the floor of a hall or a rack shelf is possible.

In a particularly preferred embodiment of the invention, the sensor device is connected to the operating device via a wire-free transmission link, for example via radio.

In order to indicate the measured inclination, the evaluation device must have information about the zero position. The zero position can be "learned" from a plurality of measurements, so that evaluation with an appropriately programmed microcomputer is possible. However, it is also possible to determine the zero position by means of a reference value, which is generated by a second sensor device for setting up a reference value for the instantaneous inclination of the chassis of the vehicle. This arrangement is expedient if the floor on which, for example, a paper reel is to be set down and on which the lifting vehicle is traveling itself has an inclination. In this case, the alignment of the paper reel only to the vertical would have the effect that the end of the paper reel would be set down obliquely relative to the floor, which according to the invention is to be avoided. In this case, a correction can be made via the measured inclination of the chassis. The second sensor device can expediently be arranged in the operating device itself, so that transmission of the data from the second sensor device to the operating device can be dispensed with.

Since a plurality of lifting vehicles are often moved in a store, it is expedient to provide transmitter-receiver encoding for the wire-free transmission from the sensor device to the operating device, so that a receiver can be programmed to a specific transmitter.

The normal acceleration measuring devices suitable as inclination sensors exhibit a certain temperature sensitivity. It can therefore be expedient to pick up the respective operating temperature in the region of the sensor device with a temperature sensor and to perform compensation for the temperature drift via a characteristic curve recorded previously. In this way, it is possible to carry out the inclination measurement reliably for a range of use from −40° C. to +80° C.

The sensor device according to the invention can be constructed in such a way that, if appropriate, in addition to the inclination measurement, the determination of the instantaneous accelerations in three-dimensional space is also possible. These signals can expediently be stored in a memory device, in order to be able to determine when the sensitive goods have been exposed to an acceleration which has or could have led to damage to the sensitive goods during transport. In a similar way, the recording of the inclinations may also be expedient for transported goods which are sensitive to inclination.

The second sensor device provided according to the invention can, in an alternative embodiment or else in addition to the second sensor device fitted to the vehicle, be arranged on a set-down surface, on which the goods held by the holding device are to be set down. As a result, differences between the inclination of the travel path of the lifting vehicle, on the one hand, and the set-down surface, on the other hand, can be taken into account, so that even in these cases sensitive goods can be set down exactly perpendicular to the set-down surface, without damage.

The second sensor arrangement is expediently connected to the operating device via a wire-free transmission link.

The output signals from the first sensor device and from the second sensor device are therefore available in the operating device. In a preferred embodiment, difference signals are formed in the operating device and can possibly be used as an indicator for the driver of the lifting vehicle, but preferably used directly to control the holding and lifting device, in order to bring the difference signal to zero when setting down on the set-down surface.

BRIEF DESCRIPTION OF THE DRAWINGS

The invention is to be explained in more detail in the following text by using an exemplary embodiment illustrated in the drawing, in which.

DESCRIPTION OF PREFERRED EMBODIMENT

Figure 1:
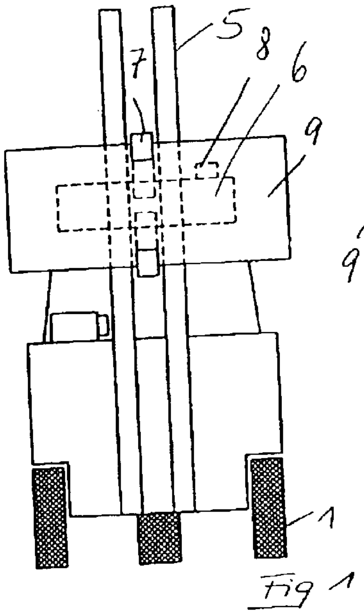
FIG. 1 shows a view from the front of a lifting vehicle with a gripped paper reel in the horizontal transport position
Figure 2:
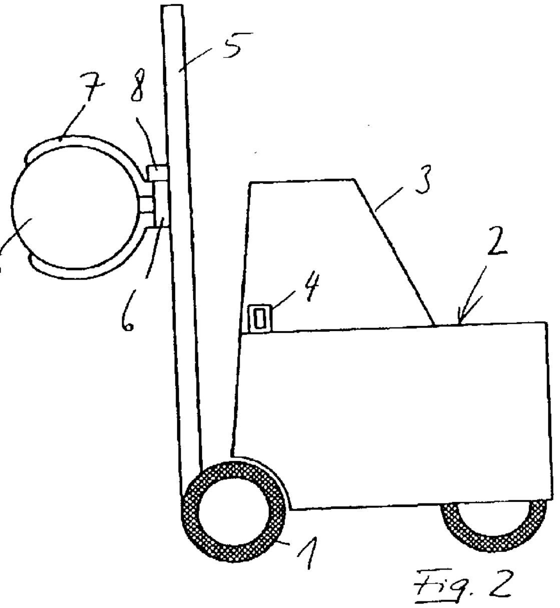
FIG. 2 shows a side view of the arrangement from FIG. 1

FIGS. 1 to 4 reveal a lifting vehicle in schematic form, which travels on three wheels 1 and has a vehicle superstructure 2 carried by a chassis (not illustrated). In a driver's cab 3 there is an operating device (not specifically illustrated) and a display 4. Arranged in front of the driver's cab 3 is a vertical guide 5 in the form of a mast formed by two parallel rods or rails. On the vertical guide 5, a holding device 6 in the form of a gripping device having two gripping arms 7 constructed in the shape of two circular arc sections can be moved substantially vertically. Fixed to the holding device 6 is a sensor device 8 for measuring the instantaneous inclination of the holding device 6. The output signals from the sensor device 8 are transmitted in a wire-free manner to the operating device and displayed on the display 4. In the exemplary embodiment illustrated, the gripping arms 7 hold a paper reel 9 whose weight is of the order of magnitude of one tonne.

Figure 3:
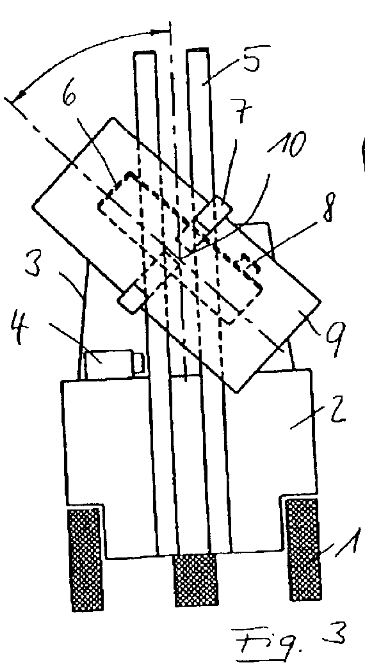
FIG. 3 shows a view from the front according to FIG. 1 with a rotated paper reel
Figure 4:
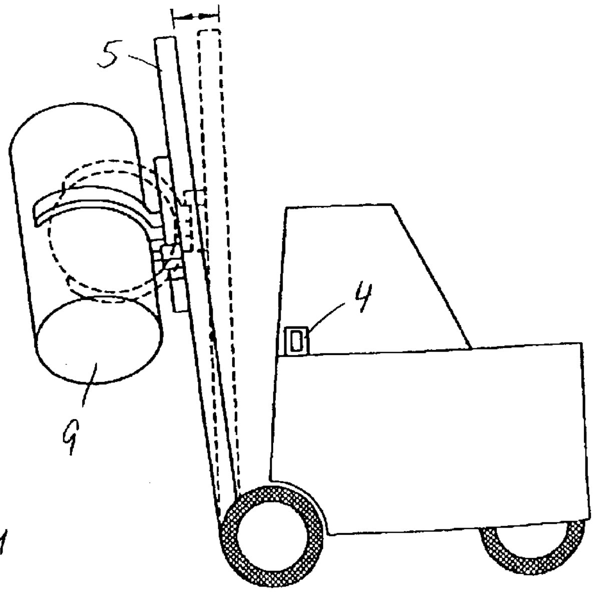
FIG. 4 shows a side view of the arrangement according to FIG. 3

FIGS. 3 and 4 illustrate the fact that the holding device 6 is designed such that it can be rotated about an axis 10 which is at right angles to the longitudinal axis of the vertical guide 5. FIG. 4 further illustrates that the vertical guide 5 can also be pivoted by a certain angular amount, in order in this way to permit alignment of the paper reel 9 as transported goods in the vertical, irrespective of any inclination of the floor on which the wheels 1 travel. In FIG. 4, two angular positions of the vertical guide 5 are illustrated by continuous and dashed lines, respectively.

Figure 5:
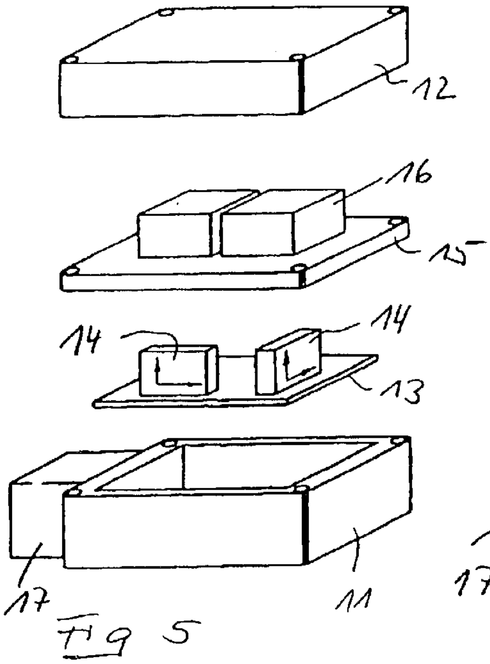
FIG. 5 shows a schematic illustration of the mechanical construction of a sensor device by illustrating the individual parts
Figure 6:
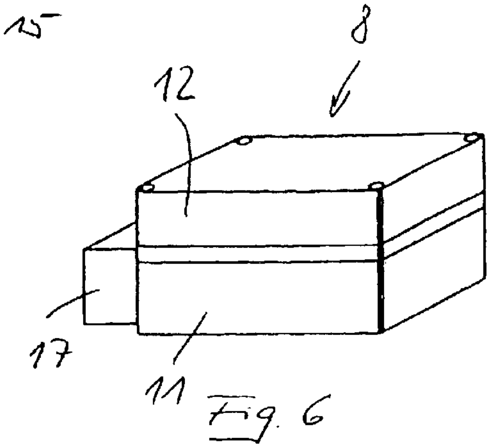
FIG. 6 shows a view of a closed housing of the sensor device

The sensor device 8 illustrated in more detail in FIGS. 5 and 6 comprises a basic housing body 11 and a cover part 12, which can be screwed to each other in a sealed manner. On a circuit board 13 that can be inserted into the housing, two acceleration measuring devices 14 are arranged orthogonally in relation to each other. The acceleration measuring devices in each case measure accelerations in two mutually orthogonal axes; in the exemplary embodiment illustrated, the axis at right angles to the plane of the circuit board 13 is measured by both acceleration measuring devices. In the plane of the circuit board 13, the two acceleration measuring devices 14 are aligned in directions which are at right angles to each other, so that overall the acceleration is measured in all three spatial directions.

If the accelerations produced by the driving of the vehicle are eliminated, a resultant acceleration in the acceleration measuring device 14 remains only in the axis at right angles to the circuit board 13, while the accelerations in the plane of the circuit board 13 are zero if the holding device 6 is precisely at right angles to the vertical, this is the acceleration due to gravity. In this way, the exact horizontal attitude of the gripping device 6, as illustrated in FIG. 1, can be detected. An attitude rotated exactly in 90° in space can be determined in an analogous way with the aid of the two acceleration meters 14.

The arrangement comprising circuit board 13 and the two acceleration meters 14 can be covered by an appropriate cover 15, in which there are batteries 16 for the power supply. FIG. 6 shows the sensor device with the closed housing parts 11, 12. A transmitting device 17 for the radio transmission of the output signals from the acceleration meters is arranged in housing attachment 18.

Figure 7:
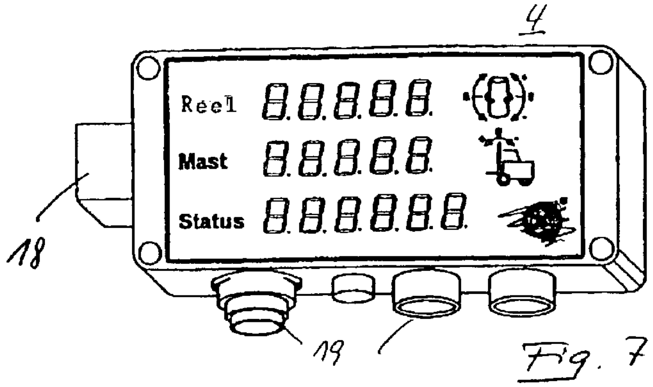
FIG. 7 shows a view of a display in an operating device

FIG. 7 shows the display 4, which is arranged in the driver's cab 3. A radio receiver for the signals emitted by the transmitting device 17 is accommodated in a housing attachment 18 to the display 4. The display 4 contains an evaluation device for these signals and permits the display of the angular position of the griped paper reel or of the holding device 6, and of the angular position of the vertical guide 5. It is also provided a status display, with which status information, such as confirmation of proper lowering, can be displayed.

Power is fed to the display device 4 via various electrical connections 19, and the data received can be transmitted, for example, to an on-board computer. Furthermore, if appropriate further sensor signals such as signals from a temperature sensor or an inclination sensor for the structure 2 of the vehicle can be transmitted. The inclination sensor for the structure 2 of the vehicle can, however, also expediently be arranged in the display 4 itself.

The action of setting a paper reel 9 down properly on a flat end face can be performed by the operator by observing the values of the display 4. However, it is also possible to intervene automatically in the control of the rotation of the holding device 6 about the axis 10 or the pivoting of the vertical guide 5 by using the signals measured by the sensor device 8, in order to ensure automatic, tilt-free setting down of the paper reel 9.

Figure 8:
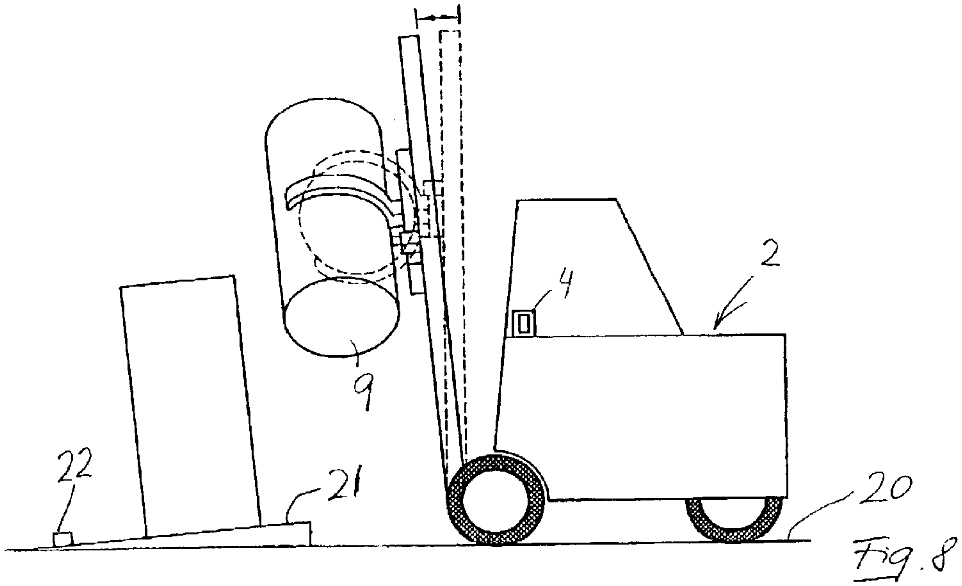
FIGS. 8 to 10 show exemplary embodiments for lowering the gripped paper reel on set-down surfaces which are inclined with respect to the standing surface of the lifting vehicle
Figure 9:
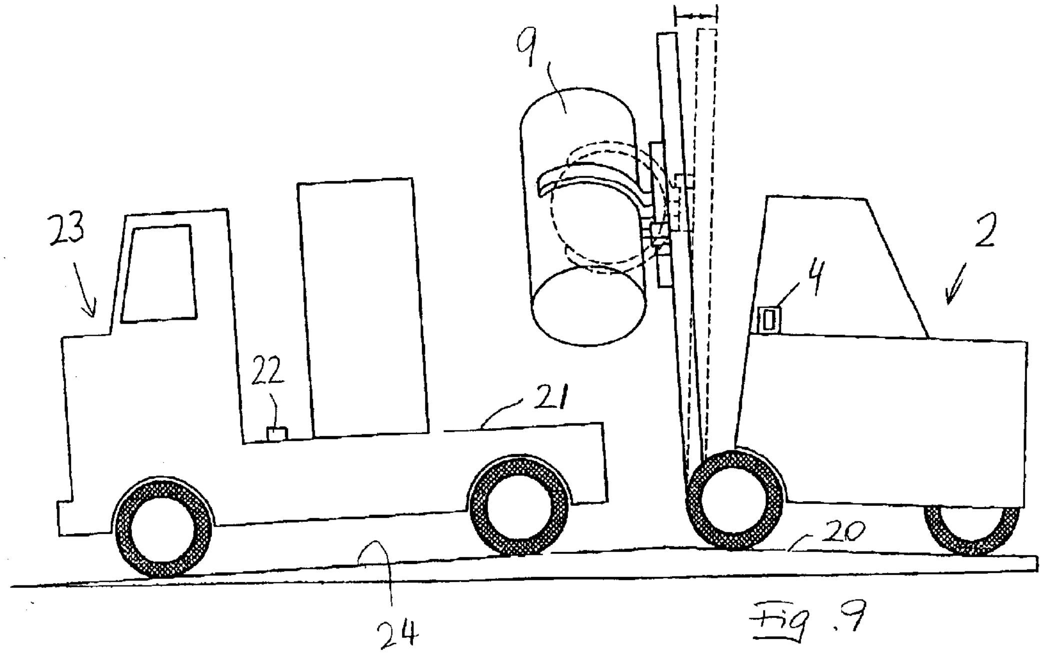
Figure 10:
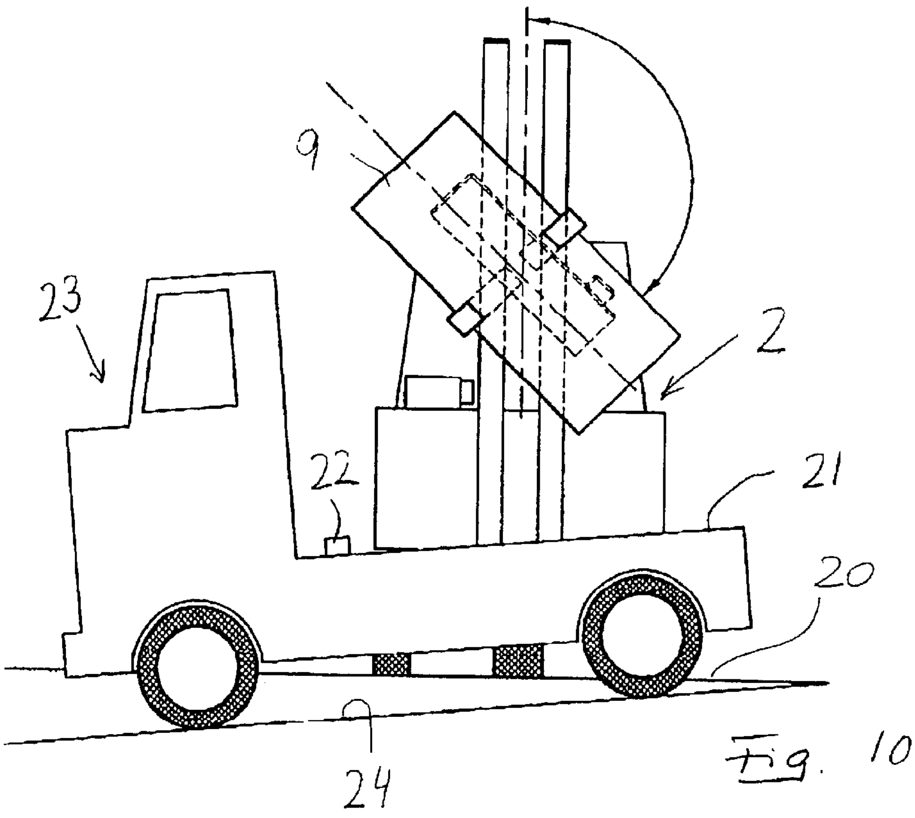

FIGS. 8 to 10 show examples in which a travel surface 20 of the lifting vehicle 2 has a different inclination than a set-down surface 21 on which the gripped paper reel 9 is to be set down. In order to permit proper unloading of the paper reel 9 with its axis precisely at right angles to the set-down surface 21—and therefore without damage—a second sensor device 22 is arranged on the set-down surface 21, having basically the same construction as the first sensor device 8 and therefore being suitable for determining the inclination of the set-down surface 21.

FIG. 9 shows, in schematic form, an exemplary embodiment in which the gripped paper reel 9 is to be loaded onto a loading surface of a motor vehicle 23, serving as a set-down surface 21. In this case, the motor vehicle 23 is standing on a travel surface 24 which is inclined with respect to the travel surface 20 of the lifting vehicle 2. Accordingly, the set-down surface 21 also has a corresponding inclination, which is detected by the second sensor device 22 and transmitted to the lifting vehicle 2.

This is correspondingly true of the exemplary embodiment according to FIG. 10, in which the vehicle to be loaded is on a travel surface 24 formed as a ramp, while the lifting vehicle 2 is traveling on a flat travel surface 20. On the basis of the data transmitted from the second sensor device, the paper reel 9 can be aligned by the lifting vehicle 2 in such a way that it is exactly at right angles to the inclination of the set-down surface 21.

Figure 11:
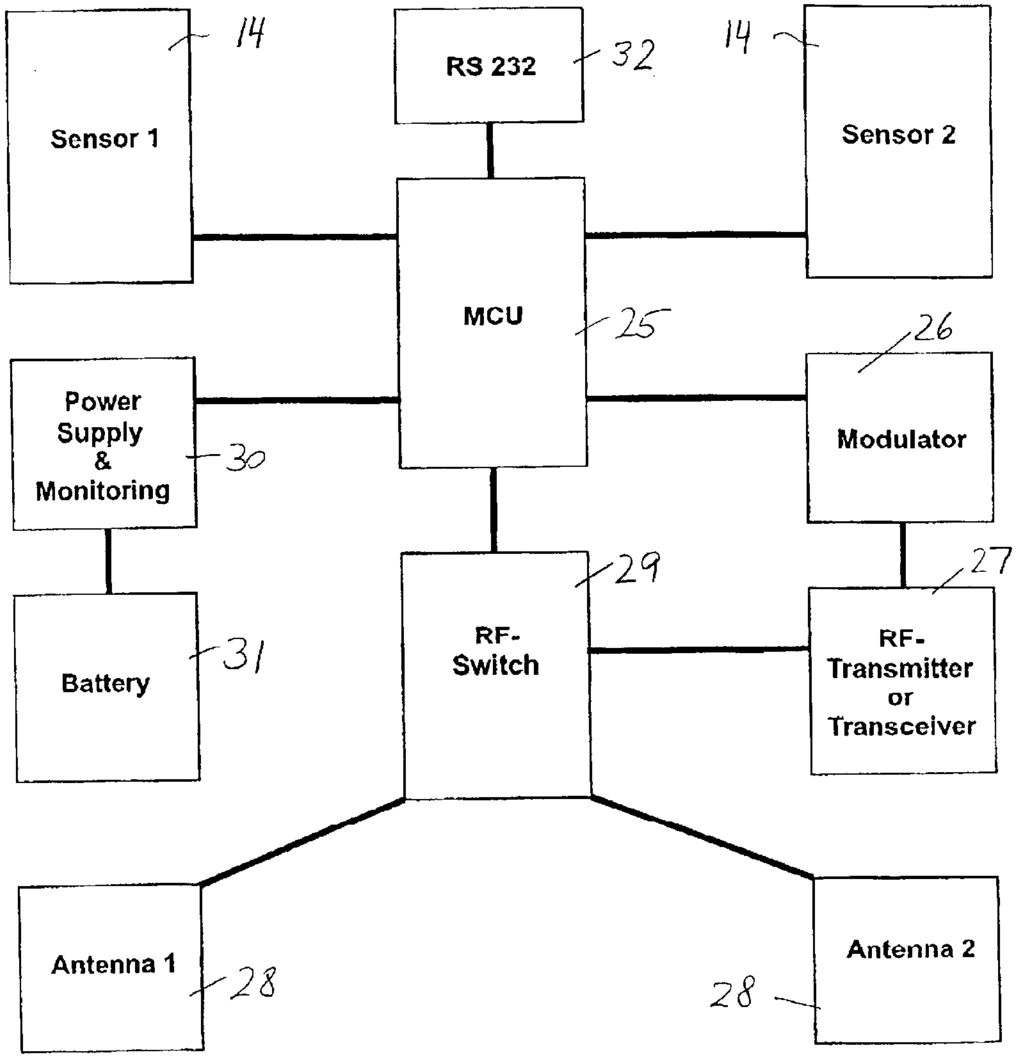
FIG. 11 shows a block diagram of the design of a sensor device
Figure 12:
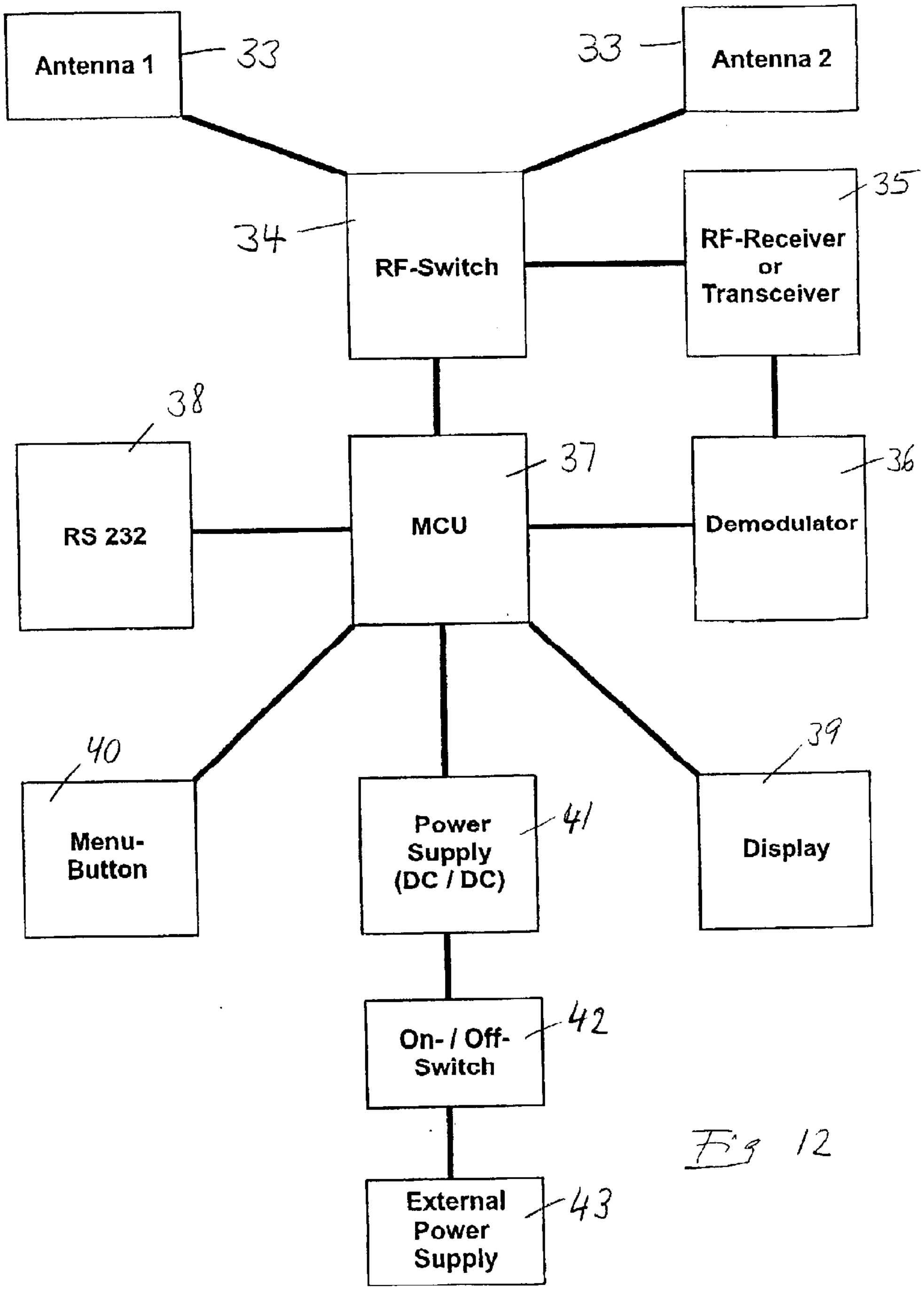
FIG. 12 shows a block diagram of a receiver unit having a display device in the operating device.

FIG. 11 shows a block diagram of a sensor unit 8, 22, which is connected in a wire-free manner to the operating device of the lifting vehicle 2. The two acceleration sensors 14 are connected to a microcontroller unit (MCU) 25. The detected acceleration values from the two sensors 14 are polled at defined time intervals and prepared to be passed on to the display unit 4 of the lifting vehicle and are encoded in binary form. The encoded measured values are led by the MCU 25 via a modulator to a high frequency transmitter 27 and emitted from there via one of two antennas 28. Changing over between the two antennas 28 is carried out with the aid of a high frequency switch 29.

To supply power to the microcontroller unit 25, a voltage supply 30 is used, to which a battery 31 is connected.

The measured values from the sensors 14, conditioned by the microcontroller unit 25, can also be transmitted by means of cables via an RS 232 interface 32.

In the display unit 4 there are likewise two antennas 33, between which a changeover is made by a high frequency switch 34. A high frequency receiver or transceiver 35 receives the high frequency signals and leads the latter via a demodulator 36 to a microcontroller unit (MCU) 37.

If the data transmission is not carried out in a wire-free manner but via a cable, the data can also be transmitted to the microcontroller unit 37 via an RS 232 interface 38.

Following the evaluation by the MCU 37, the measured data can be reproduced on a display 39, for example also in the form of difference data. The type of reproduction can be selected with the aid of the MCU 37 via a menu button 40.

The MCU 37 is supplied by a power supply unit 41, which can be connected to an external voltage supply 43 via an on/off switch 42.

The sensor devices 8, 22 illustrated can readily also be used for measuring instantaneous accelerations in three-dimensional space.

As compared with the rather more static acceleration measurement which is required for determining the inclination, it is merely necessary for higher frequency signals from the sensor devices 8, 22 to be evaluated and stored. It is therefore readily possible, for example by using the sensor device 8 fitted to the holding device 6, to sense and if necessary to record both the inclination and the instantaneous accelerations in three-dimensional space. If appropriate, the signals for the inclination and for the instantaneous accelerations can be separated from one another by means of appropriate frequency dividing networks.

What is claimed is:

1. A lifting vehicle having a holding and lifting device for holding and lifting or lowering goods, an operating device for controlling the traveling and the handling of the goods held by the holding device and a sensor device which is arranged on the holding device, the sensor device having at least one acceleration measuring device for determining the instantaneous inclination and the instantaneous acceleration of the holding device.

2. The lifting vehicle as claim in claim 1, in which the sensor device is designed to detect the instantaneous inclination in three-dimensional space.

3. The lifting vehicle as claimed in claim 1, in which the sensor device has two acceleration measuring devices substantially orthogonal to each other.

4. The lifting vehicle as claimed in claim 1, in which the sensor device is connected to the operating device.

5. The lifting vehicle as claimed in claim 1, in which the operating device has a display for the instantaneous inclination of the holding device.

6. The lifting vehicle as claimed in claim 1, in which a processing stage is provided in the operating device, which uses the output signals from the sensor device to influence the control of the holding and lifting device.

7. The lifting vehicle as claimed in claim 1, in which the sensor device is connected to the operating device via a wire-free transmission link.

8. A lifting vehicle having a holding and lifting device for holding and lifting or lowering goods, and having an operating device for controlling the travel and the handling of the goods held by the holding device, the holding device being equipped with a sensor device, wherein the sensor device has at least one acceleration measuring device for determining the instantaneous inclination and/or the instantaneous acceleration of the holding device, and a second sensor device having at least one acceleration measuring device being provided to set up a reference value for the inclination with respect to a set-down surface.

9. The lifting vehicle as claimed in claim 8, in which the second sensor device is provided on the vehicle itself in order to set up a reference value for the instantaneous inclination with respect to a chassis of the vehicle.

10. The lifting vehicle as claimed in claim 8, in which the second sensor device is arranged on a set-down surface envisaged for the setting down of the goods held by the holding device.

11. The lifting vehicle as claimed in claim 8, in which the second sensor device is connected to the operating device via a wire-free transmission link.

12. The lifting vehicle as claimed in claim 8, in which the operating device uses the signals from the two sensor devices to form difference signals, which can be reproduced on a display.

13. The lifting vehicle as claimed in claim 8, in which the operating device uses the signal from the two sensor devices to form difference signals and controls the handling of the goods on the basis of the difference signals formed.

14. The lifting vehicle as claimed in claim 8, in which both sensor devices are designed to detect the instantaneous inclination in three-dimensional space.

15. The lifting vehicle as claimed in claim 8, in which the two sensor devices in each case have two acceleration measuring devices substantially orthogonal to each other.

* * * * *